United States Patent [19]
Blake

[11] Patent Number: 5,967,575
[45] Date of Patent: Oct. 19, 1999

[54] DEVICE FOR GRABBING A HOOK SUPPORTED BY AN OBJECT

[76] Inventor: Albert C. Blake, P.O. Box 2038, Mt. Sunapee, N.H. 03255

[21] Appl. No.: 09/080,416

[22] Filed: May 18, 1998

[51] Int. Cl.⁶ .............................. B25J 1/00; B63B 21/54
[52] U.S. Cl. ...................................... 294/19.1; 114/221 R
[58] Field of Search .............................. 294/19.1, 22, 23, 294/24, 50.8, 50.9, 103.1, 104; 81/487, 488; 114/221 R, 230

[56] References Cited

U.S. PATENT DOCUMENTS

| | | | |
|---|---|---|---|
| 1,638,703 | 8/1927 | Pendleton | 294/19.1 X |
| 2,116,880 | 5/1938 | Dee | 294/19.1 |
| 2,869,914 | 1/1959 | Yoakley | 294/19.1 X |
| 3,913,515 | 10/1975 | Hernsjo | 114/230 |
| 4,595,223 | 6/1986 | Hawle | 294/19.1 |
| 4,932,700 | 6/1990 | Hart | 294/19.1 |
| 4,986,207 | 1/1991 | Reed | 294/19.1 X |
| 5,190,330 | 3/1993 | Dunham | 204/19.1 |
| 5,192,104 | 3/1993 | Lin | 294/19.1 |
| 5,215,344 | 6/1993 | Augustyniak | 294/19.1 |
| 5,365,688 | 11/1994 | Yong-Set | 43/5 |
| 5,454,611 | 10/1995 | Wanat | 294/24 |
| 5,622,399 | 4/1997 | Albright | 294/24 |

Primary Examiner—Johnny D. Cherry
Attorney, Agent, or Firm—Davis and Bujold

[57] ABSTRACT

A device for facilitating grabbing of a hook from a mooring, for example to facilitate both hooking and unhooking of the hook from the mooring. The device includes a pair of clamps for grabbing the hook and a lever for actuating operation of the clamps. The device further includes an elongate shaft for supporting both the lever and the hooks.

15 Claims, 4 Drawing Sheets

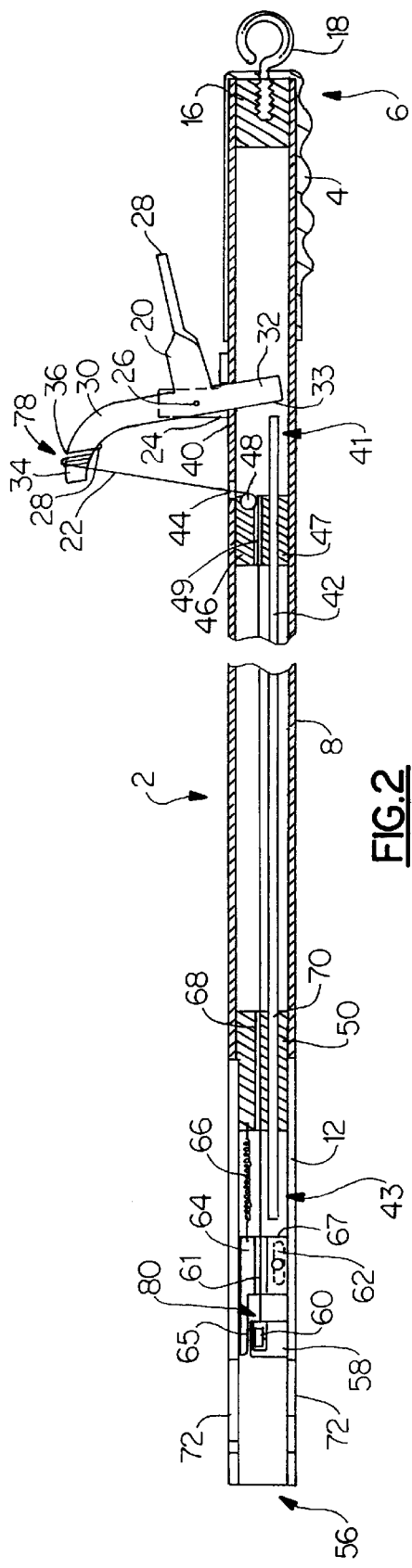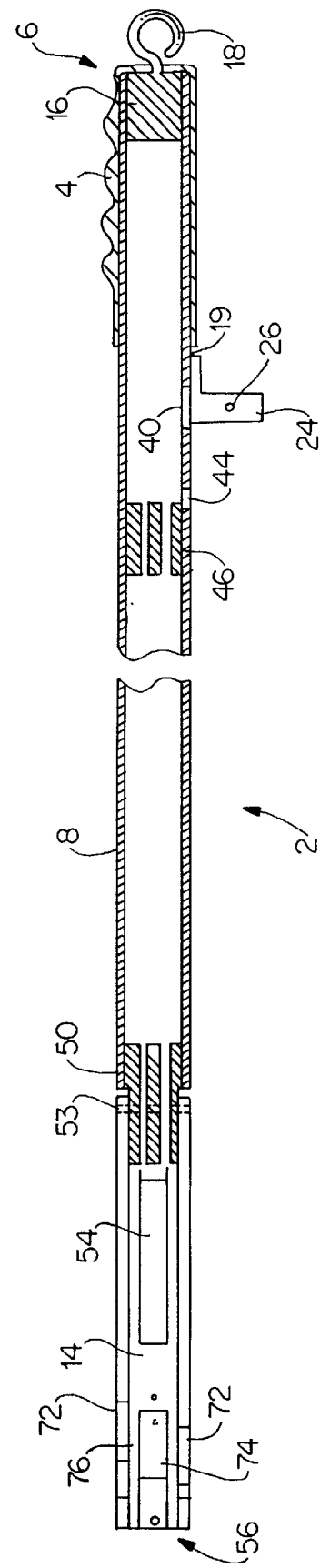
FIG.2
FIG.3

DEVICE FOR GRABBING A HOOK SUPPORTED BY AN OBJECT

The present invention relates to a device for facilitating grabbing of a conventional hook to facilitate both connecting as well as disconnecting of the hook from a desired object, such as a boat mooring.

BACKGROUND OF THE INVENTION

There are a variety of known devices which assist a user with either hooking a conventional hook to a boat mooring or some other device or object as well as facilitating unhooking of the hook from a desired object. However, all the known prior art devices suffer from a number of associated drawbacks. In particular, the devices do not allow the conventional hook to be readily grasped by the device while, at the same time, facilitating movement of the latch member for both hooking and unhooking the conventional hook from a desired object.

SUMMARY OF THE INVENTION

Wherefore, it is a object of the present invention to overcome the aforementioned problems and drawbacks associated with the prior art designs.

An object of the invention is to provide a device which facilitates secure grasping of a conventional hook while, at the same time, facilitating positive movement of the latch member from a closed position to an open position to facilitate both hooking and unhooking of the hook member from a desired object at a distal location.

A further object of the invention is to provide a device which is light weight, relatively inexpensive to manufacture, and is a non-corrosive product, e.g. manufactured from plastic, stainless steel or some other non-corrosive material.

Another object of the invention is to provide a device in which the length of the device can vary, from application to application, depending upon the end use of the device.

The invention relates to a hook grabbing device for grabbing a hook and opening and closing a latch member of the hook to facilitate hooking and unhooking of the hook from a desired object, said hook grabbing device comprising: an elongate shaft having opposed first and second ends; a first portion of a lever mechanism being supported adjacent a first end of said elongate shaft; first and second clamp members being supported adjacent a second opposed end of said elongate shaft; a second portion of said lever mechanism being coupled to said first and second clamp members for facilitating operation of said clamp members, and said lever mechanism further controlling operation of a push arm being supported by said second clamp members and being located to interact with a latch member of the hook to open and close the latch member of the hook and facilitate hooking and unhooking of the hook from a desired object.

BRIEF DESCRIPTION OF THE DRAWINGS

The invention will now be described, by way of example, with reference to the accompanying drawings in which:

FIG. 2 is a diagrammatic cross-sectional view of the unrotated grabbing device of FIG. 1 looking in a direction substantially perpendicular to the plane of the paper;

FIG. 3 is a diagrammatic cross-sectional view of the grabbing device of FIG. 1 looking in the opposite direction to that of FIG. 2;

DESCRIPTION OF THE PREFERRED EMBODIMENTS

Figure 1:
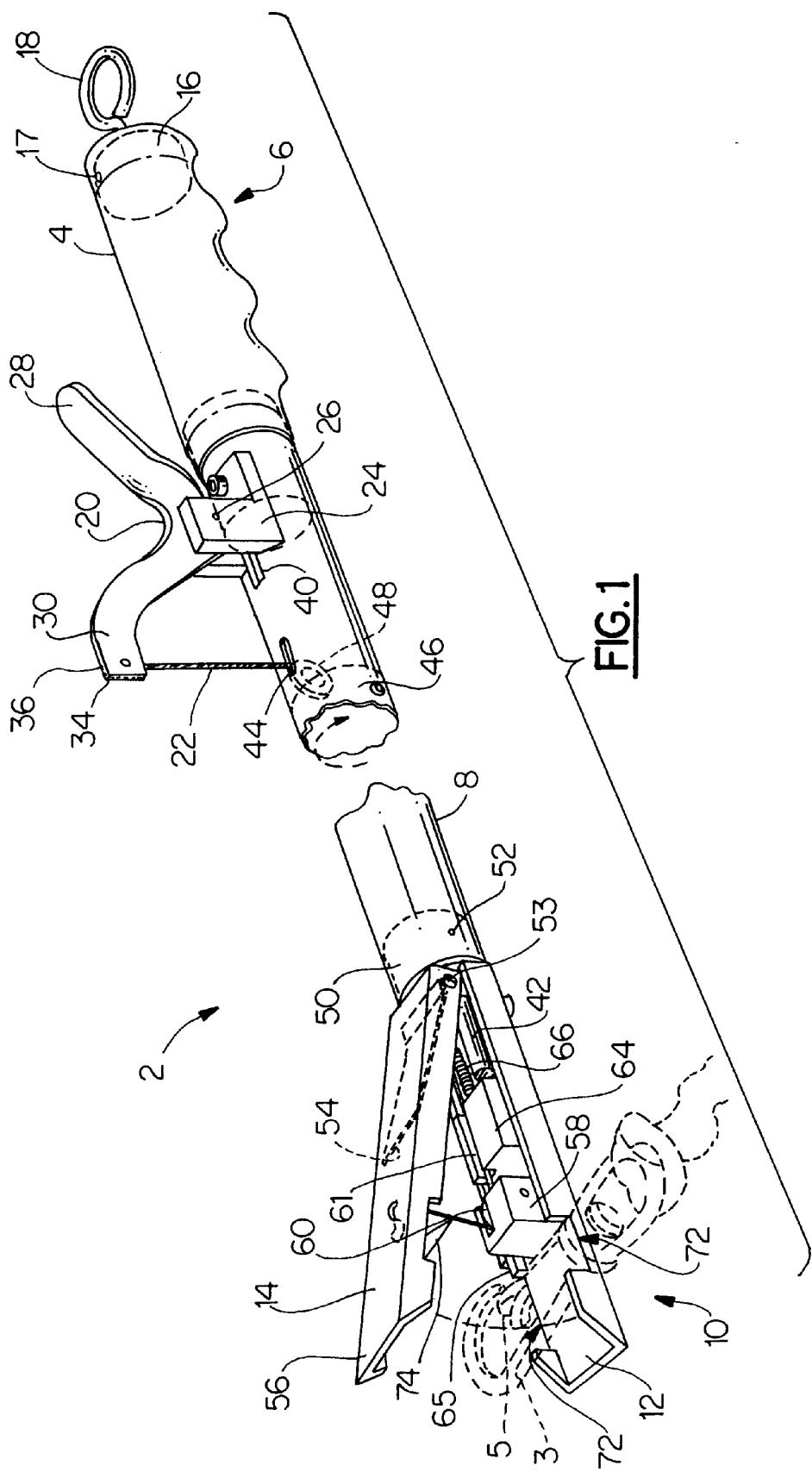
FIG. 1 is a perspective view of the grabbing device according to the present invention, the length of which is shown broken to depict a variable length, with the handgrip portion of the grabbing device rotated 90° relative to the clamping portion for reasons of clarity.

Turning now to FIGS. 1–3, a detailed description concerning the grabbing device, according to the present invention, will now be provided. As can be seen in these figures, the grabbing device 2 comprises a conventional hand grip 4 which is mounted to and covers a first end portion 6 of an elongate hollow shaft 8. The opposite end portion 10 of the elongate shaft 8 supports a pair of opposed clamp members 12, 14 which facilitate clamping of a desired hook 3 between inwardly facing surfaces thereof. A further detailed description concerning clamping of the hook 3 therebetween will be provided below.

The first end portion 6 of the shaft 8 also supports a pivotable lever 20 which is connected to the clamp members 12, 14 by a flexible cable 22, e.g. a wire cable, to control operation of the clamp members 12, 14. A further detailed description concerning such interconnection as well as the purpose of the same will be provided below.

As can be seen in FIGS. 2 and 3, the hand grip 4 is slightly resiliently expanded and encases the first end portion 6 of the shaft 8. If desired, an inner disc 16, provided with a central threaded through bore, can be located adjacent the first end portion 6 of the shaft to facilitate securing of an eye hook 18 thereto in a conventional manner. It is to be appreciated that the inner disc 16 can be welded or secured to the first end portion 6 in any other conventional manner. As such teaching is well known in the art, a further detailed description concerning the same is not provided.

A support member 24 is mounted on an exterior surface 19 of the elongate shaft 8 adjacent the hand grip 4. The support member 24 provides support for the pivotable lever 20. The support member 24 can be formed as part of the elongate shaft 8, or can be a separate piece securely attached to the elongate shaft 8, e.g. glued, welded, etc., at a desired location. The support member 24 carries a pin 26 which extends through an intermediate portion of the pivotable lever 20 to provide a pivoting connection to the pivotable lever 20.

The pivotable lever 20 has a first arm 28, a second arm 30 and a third arm 32 (see FIG. 2) which all extend from the intermediate portion of the pivotable lever 20. The first arm 28 extends from the intermediate portion generally in the direction of the first end portion 6, but forms a sight angle therewith, e.g. an angle of about 30° relative to the elongate shaft 8. This angle can vary as long as a sufficient distance is provided between the first arm 28 and the elongate shaft 8 to allow a user to depress the first arm 28 towards the hand grip 4 and activate the clamp members 12, 14.

The second arm 30 extends from the intermediate portion at angle of approximately 90° with respect to the first arm 28. A free end of the second arm curves back towards the second end portion of the elongate shaft 8. A first end of the flexible cable 22 is connected to the free end of the second arm 30 in a conventional manner, e.g. by a screw, i.e. the cable 22 extends through a notch 34 and then back through a bore 36, out of the arm 30 and is then frictionally fastened, via a press fit, to the arm by a screw 38. If desired, a conventional mechanism for tightening any extra "play" in the flexible cable 22 can be provided. As such feature is well known to those skilled in this art, a further detailed description concerning the same is not provided herein.

The third arm 32 of the pivotable lever 20 extends from the intermediate portion at an angle of approximately 90° with respect to the first arm 28, in an opposite direction to that of the second arm 30. A free first end 33 of the third arm 30 projects through a first aperture 40 provided in the elongate shaft 8. A slidably mounted elongate push rod 42 is located within the elongate shaft 8 and the first end 41 of the elongate push rod 42 is located to engage with the free end 33 of the third arm 32. When the pivotable lever 20 is activated, the third arm 32 initially moves a small distance toward the second end portion of the shaft 8 prior to contacting the first end 41 of the elongate push rod 42 and causing movement thereof, and a further description concerning the same will follow.

The angles at which each of the three arms 28, 30, 32 extend relative to one another can vary from application to application. The arms need only be positioned such that they may carry out the desired function according to the teaching of the present invention.

An insert member 46, which supports a first rotatable pulley wheel 48, is fixedly located inside the shaft 8 adjacent the first aperture 40. The insert member 46 also has a cable through bore 49 formed therein which is aligned with the first pulley wheel 48. The first pulley wheel 48 and the cable through bore 49 facilitate translation of the wire cable 22 when the pivotable lever 20 is activated. In addition, the insert member 46 has a push rod through bore 47 formed therein which accommodates the first end portion 41 of the elongate push rod 42. A further detailed description concerning the function of these components will follow below.

The second end of the shaft 8 accommodates a plug member 50 which is partially housed within the second end portion 10 of the elongate shaft 8. The plug member 50 is secured to the second end 10 of the elongate shaft 8 by at least one fastener 52 such as a pin, screw, clamp, etc. It is to be appreciated that the plug member 50 can be welded, glued or otherwise secured in place in a conventional manner. The end of the plug member 50 which protrudes from the second end 10 of the elongate shaft 8 has four flat surfaces to facilitate mounting of the two clamp members 12, 14 thereon. The first clamp member 12 is fixedly secured to the plug member 50 by at least one fastener, e.g. such as a pin, screw, clamp, welding, gluing, etc., while the second clamp member 14 is pivotally attached to the plug member 50 via a pivot pin 53. The plug member 50 is also provided with a cable through bore 68 and a push rod through bore 70 and a further discussion concerning the same will be provided below.

A spring 54 is located against an inner surface of the second clamp member 14, e.g. sandwiched between the second clamp member 14 and the plug member 50, for biasing a free end 56 of the second clamp member 14 away from the first clamp member 12 to maintain the two clamp members 12, 14 in an open position.

An intermediate area of the first clamp member 12 carries a fixedly secured support block 58 which supports a second rotatable pulley wheel 60 which is aligned with the cable through bore 68 and the first rotatable pulley wheel 48 and the cable through bore 49 supported by the insert member 46. In addition, the first clamp member 12 also supports a slidable push member 64 which is allowed to slide along an elongate slot 62, provided in the first clamp member 12. The elongate slot 62 limits the to and fro movement of the slidable push member 64. The slidable push member 64 is normally biased into a first retracted position, by a tension spring 66, so that the slidable push member 64 is normally located spaced from a hook when accommodated by the grabbing device 2. The slidable push member 64 has an elongate slot 61 provided in a top surface thereof to allow unhindered passage of the cable 22 therethrough. The slidable push member 64 supports a push arm 65 which is located to engage with the latch member 5 of the hook 3 and facilitate opening and closing of the latch member 5.

The side walls of each one of the clamp members 12, 14 are provided with a recessed area 72 which is sized to closely accommodate a desired size conventional hook 3 therebetween. In addition, the second clamp member 14 can be provided with a spring 74, mounted on an inwardly facing surface 76 thereof, to facilitate proper alignment and position of the conventional hook 3 between the clamp members 12, 14 to ensure that the hook 3 lies flat against the clamp members 12, 14 as the clamp members 12, 14 are moved to their closed position.

As previously described above, the first end 78 of the cable 22 is attached to the second arm 30 of the lever 20. The cable 22 extends downwardly through the first aperture 44 and partially wraps around the first rotatable pulley wheel 48. The cable 22 then extends through the cable throughbore 49 and along the interior of the shaft 8 and out through the cable through bore 68. The cable 22 passes through the elongate slot 61 and partially wraps around the second rotatable pulley wheel 60 and finally is connected to the second clamp member 14 by a conventional connector, i.e. being the frictional press fit between an inwardly facing surface of the clamp member and a screw, for example, or any other conventional attachment mechanism.

As previously discussed, the third arm 32 of the pivotable lever 20 cooperates with the first end 41 of the elongate push rod 42. The push rod 42 extends from adjacent the third arm 32 of the pivotable lever 20, through the first push rod through bore 47 provided in the insert member 46, through the second push rod through bore 70 located in the plug member 50, and terminates at a second end 43, located to cooperate with a pushing surface 67 of the slidable push member 64 to bias the slidable push member 64 into a second active position, i.e. bias the push arm 65 into engagement with the latch member 5.

It is to be appreciated that the cooperation between the elongate push rod 42 and the slidable push member 64, provided in this arrangement, inherently incorporates some degree of "play" so that the pivotable lever 20 has to be at least partially depressed before the elongate push rod 42 will be pushed by the third arm 32 of the pivotable lever 20 against the pushing surface 67 of the slidable push member 64. This play allows the clamp members 12, 14 to sufficiently clamp the hook 3 therebetween prior to operation of the slidable push member 64.

By the above arrangement, it is ensured that the hook 3 is at least partially clamped between the first and second clamp members 12, 14 prior to any sliding motion of the slidable push member 64. This ensures that the push arm 65 of the slidable push member 64, located to engage with the latch member 5 of the hook 3, does not contact the latch member 5 until the hook 3 is sufficiently clamped between the two clamp members 12, 14. This prevents the hook 3 from becoming twisted or dislodged from the clamp members 12, 14 due to the opening or closing motion of the latch member 5.

The cable 22 of the grabbing device 2 is tensioned such that when the pivotable lever 20 is substantially fully depressed, the two clamp members 12, 14 are in an abutting engagement with one another and the hook 3 is captively retained between the inwardly facing surface of the clamp members 12, 14 within the recessed areas 72. Secondly, the push arm 65 has also sufficiently depressed the latch member 5 so that the hook 3 can be easily hooked to, or unhooked from, any desired object, e.g. a boat mooring.

When the pivotable lever 20 is released, the push arm 65 initially disengages from the latch member 5 of the hook 3, via the action of spring 66, which allows the latch member 5 to close, due to an internal spring arrangement (not shown) of the latch member 5. Further releasing motion of the pivotable lever 20 allows the two clamp members 12, 14 to separate from one another so that the hook 3 can be readily released therefrom.

Each one of the clamp members 12, 14 generally is a C-shaped channel member which has a width of approximately one inch and a height of approximately 0.5 inches, e.g. the width is approximately two times the height. A portion of the opposed surfaces of each channel is removed to facilitate accommodating of a desired hook 3 therebetween, i.e. to form recessed areas 72. As can be seen in FIGS. 1 to 3, for example, due to the contour of the desired hook 3 to be accommodated by the clamp members 12, 14, a greater portion of one sidewall of each clamp member is removed. It is to be appreciated that the amount of the sidewall material removed from the two mating clamp members 12, 14 will, in most applications, generally mirror one another so that when the hook 3 is accommodated between the two clamp members, the hook 3 is captively retained thereby and has only very slight movement.

If desired, the hook accommodating surfaces can be chamfered, rounded or grounded so that there are no exposed sharp edges to cause injury. In addition, the free end 56 of each of the clamp members 12, 14, can be tapered or contoured to allow the clamp members 12, 14 to more easily slide under a hook 3, line, rope or chain during the process of grabbing the hook 3 and engaging the hook 3 with the clamp members 12, 14.

Figure 4:
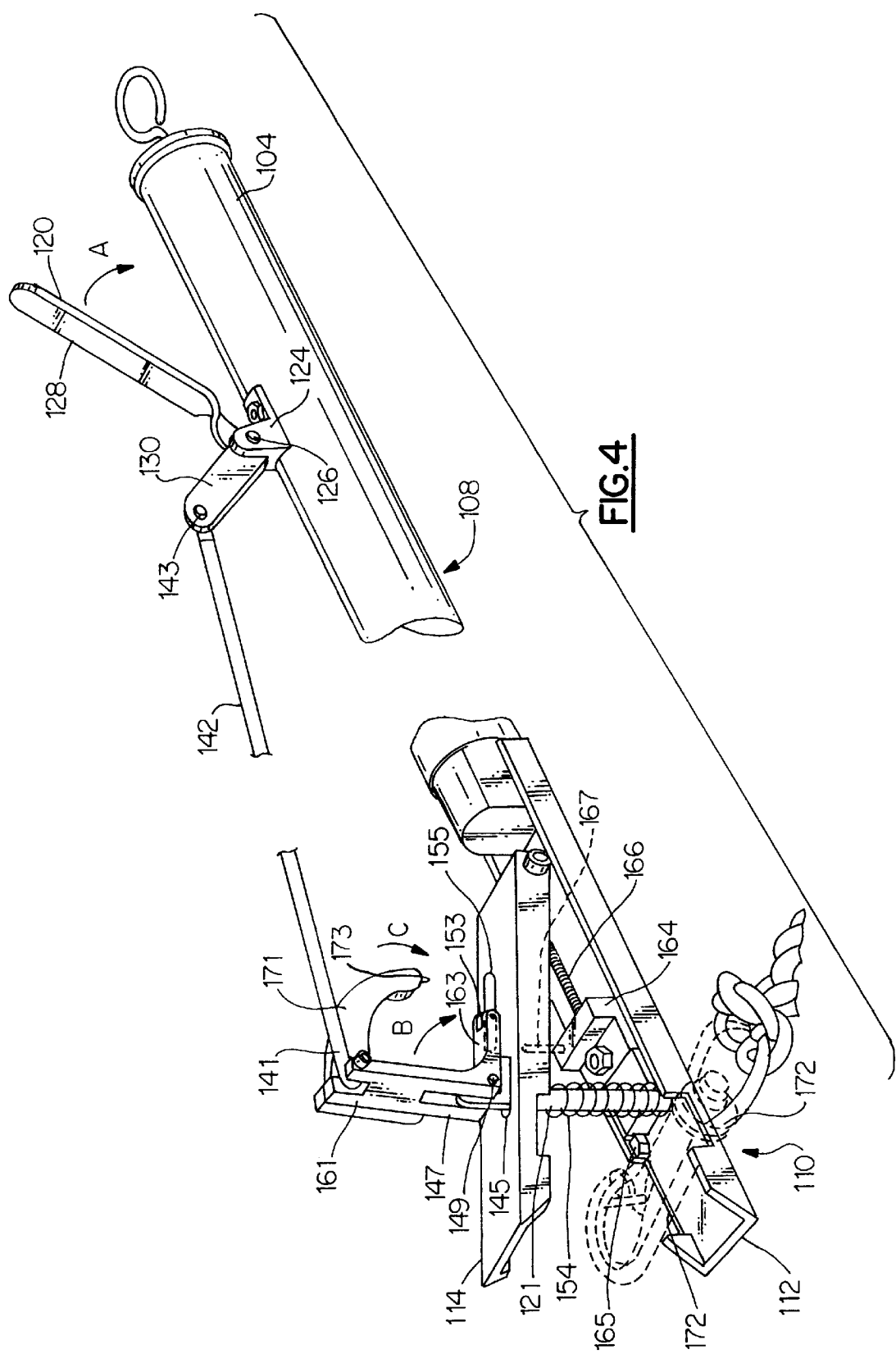
FIG. 4 is a diagrammatic perspective view of a second embodiment of the grabbing device of the present invention.

Turning now to FIG. 4, a discussion concerning a second embodiment of the present invention will now be described. As this embodiment is very similar to the first embodiment, only the differences between the first embodiment and the second embodiment will be described in detail.

The basic difference between the second embodiment and the first embodiment is the arrangement of the pivot lever 120 used to actuate the second clamp member 114. According to this embodiment, the support member 124 is mounted to an exterior surface of the elongate shaft 108 adjacent the hand grip 104. The support member 124 provides a pivotal support, in a conventional manner, for the pivotal lever 120. The support member 124 can be formed as part of the elongate shaft 108 or can be a separate piece fixedly attached thereto. The support member 124 carries a pin 126 which extends through an intermediate portion of the pivotal lever 120 to provide a pivoting connection thereto.

The pivotal lever 120 has first and second arms 128, 130 which extend from the intermediate portion of the pivotal lever 120. The first and second arms 128, 130 form a substantially right angle with respect to one another. During use, an operator biases the first arm 128 toward the handle grip 104 (in the direction of arrow A) which, in turn, also pivots the second arm 130 in the direction of arrow A (to the right as can be seen in FIG. 4).

As with the previous embodiment, the second clamp member 114 is pivotally attached to the opposite end portion 110 of the shaft 108. A post 121 is attached to an inwardly facing surface of the first clamp member 112 and the post 121 extends perpendicularly from a base of the first clamp member 112 and supports a compression spring 154. The post 121 extends through an opening 145 provided in the second clamp member 114. A free end of the post 121 pivotally supports an L-shaped pivoting member 147. The L-shaped pivoting member 147 is pivotally supported to a top portion of the post 121 via a pin 149 extending through the post 121 and an intermediate portion of the L-shaped member 147.

A free end of a first leg 161 of the L-shaped member 147, which extends substantially parallel to the post 121, as can be seen in FIG. 4, is pivotally attached to a first end 141 of an activation rod 142. The opposite end 143 of the activation rod 142 is pivotally attached to the second arm 130 of the pivotal level 120. The free end of the first leg 161 of the L-shaped member 147 also fixedly supports a C-shaped pusher member 171 and a further detailed description concerning the same will follow.

The second leg 163 of the L-shaped member 147 carries a rotatable roller 153 which facilitates rolling engagement of the second leg 163 with an exterior outwardly facing surface of the second clamp member 114. A second aperture 155 extends through the second clamping member 114 which allows a free end 173 of the C-shaped pusher member 171 to engage with, via the second aperture 155, pusher post 167 supported by the slidable pusher member 164 to bias the slidable pusher member 164 into a second position. The slidable push member 164 has a push arm 165 which is located to engage with the latch member 5 of the hook 3 but does not contact the latch member 5 until the hook 3 is sufficiently clamped between the two clamp members 112, 114, as with the previous embodiment.

As the pivotal lever 120 is biased toward the hand grip 104 (i.e. moved in the direction of arrow A), the actuation rod 142 commences pivoting motion of the L-shaped member 147 (i.e. pivoting in the direction of arrow B). Such pivoting motion causes the roller 153, attached to the second leg 163 of the L-shaped member 147 to roll along the exterior surface of the second clamp member 114 and thereby bias the second clamp member 114 toward the first clamp member 112 and commence closing of the second clamp member 114.

Once the two clamp members 112, 114 are sufficiently engaged with one another by the action of the roller 153, further pivoting motion of the pivot lever 120 (in the direction of arrow A) causes the free end 173 of the C-shaped pusher member 171 to pass through the second aperture 155 provided in the second clamp member 114 and engage with the pusher post 167 of the slidable push member 164 to move the slidable push member 164 toward the hook 3 to open the latch member 5 of the hook 3 accommodated between the clamp members 112, 114. The push arm 165 of the slidable push member 164 is located to engage with the latch member 5 of the hook 3 and facilitate opening and closing of the latch member 5. As the second clamp member 114 moves toward the first clamp member 112, the pusher post 167 is aligned with and passes through the second aperture 155 so as to be engaged by the free end 173 of the C-shaped pusher member 171.

Upon release of the pivotal lever 120, the push arm 165 initially disengages from the latch member 5 of the hook 3, i.e. is retracted by the spring 166, which allows the latch member 5 to close, due to an internal spring arrangement (not shown) of the latch member 5. Further releasing motion of the pivotable lever 120 allows the clamp members 112, 114 to be biased away from one another by the spring 154 supported on the post 121 which, in turn, allows the hook 3 to be removed from the device. In all other respects, this embodiment is very similar to the first embodiment of FIGS. 1–3.

Figure 5:
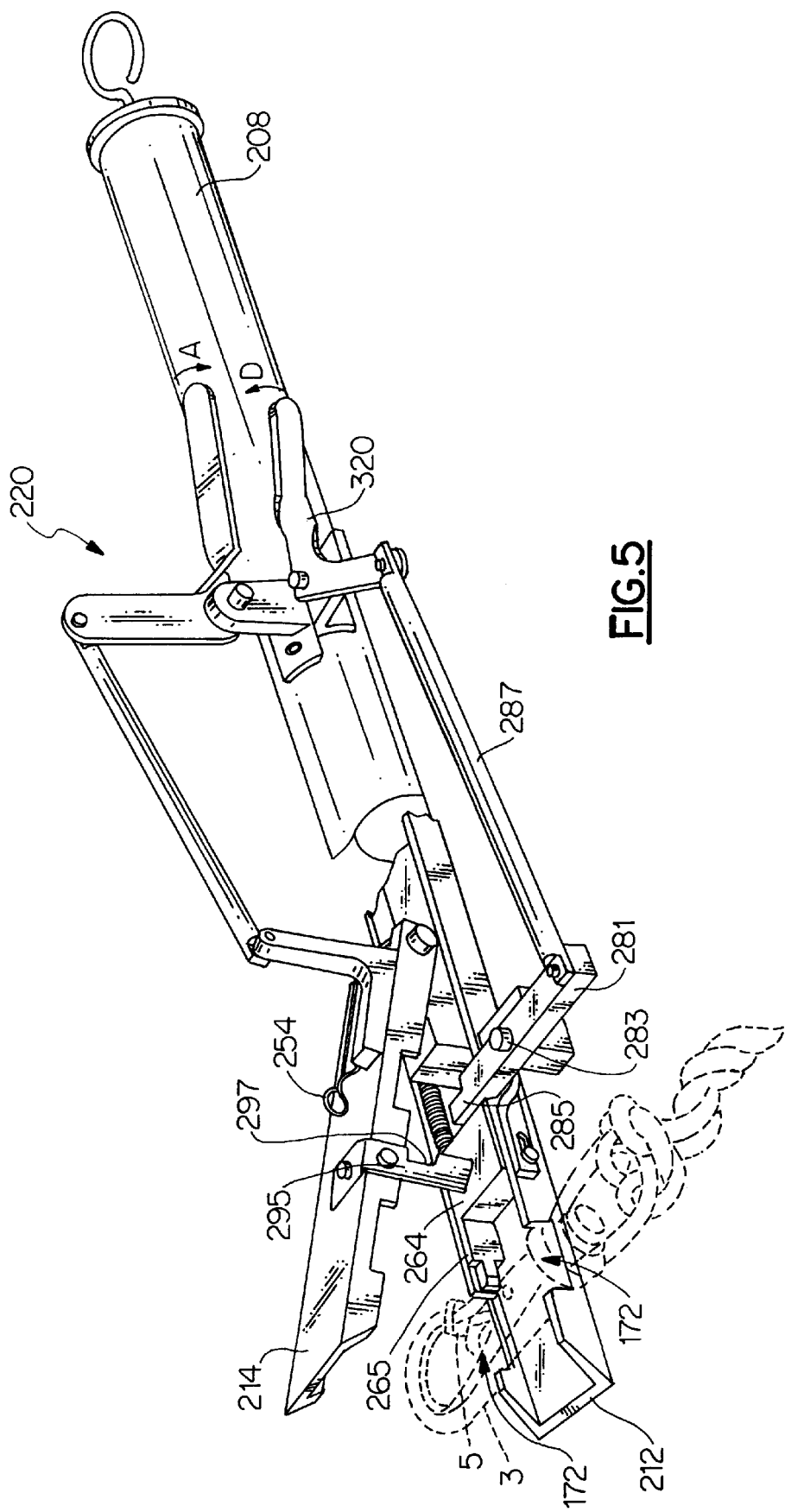
FIG. 5 is a diagrammatic perspective view of a third embodiment of the grabbing device of the present invention.

Turning now to FIG. 5, a third embodiment of the present invention will now be described. As this embodiment as well is very similar to the first embodiment, only the differences between the third embodiment and the first embodiment will be described in detail.

The major difference between this embodiment and the embodiment of FIGS. 1–3 is that the latch mechanism comprises a pair of pivotal levers 220, 320, instead of a single lever. A first one of the pivotal levers 220 operates opening and closing of the clamp members 212, 214 while the second pivotal lever 320 operates biasing of the slidable push member 264 from a first retracted position to a second active position to open the latch member 5 of the hook 3.

According to this embodiment, the first and second clamping members 212, 214 are biased into a closed clamping position by a leaf spring 254 contacting an exterior surface of the second clamp member 214. Actuation of the first lever 220, in the direction of arrow A, positively moves the clamp members 212, 214 to an open position against the action of the leaf spring 254. Once the hook 3 is properly located within the recessed area 172 of the first and second clamping members 212, 214, with the latch member 5 of the hook 3 facing the slidable push member 264, the first lever 220 is released. This causes the leaf spring 254 to bias the clamping members 212, 214 into their closed clamping position.

After this has occurred, the second lever 320 is biased toward the shaft 208, e.g. pivoted in the direction of arrow D, by a user and this causes the movable pivot arm 281, connected to the second lever 320 by an actuation rod 287, to pivot about a central pivot 283. A free end 285 of the movable pivot arm 281 is located to bias the slidable push member 264, as the movable pivot arm 281 pivots about its central pivot 283, from its first retracted position to its second active position so that a push arm 265 of the slidable push member 264 engages with the latch member 5 of the hook 3. As with the previous embodiments, the push arm 265 does not contact the latch member 5 until the hook 3 is sufficiently clamped between the first and second clamp members 212, 214.

A locking member 295 is supported by the second clamp member 214 and supports a notch 297 in an intermediate area thereof. The notch 297 is located to engage with the movable pivot arm 281, once the movable pivot arm 281 sufficiently biases the slidable push member 264 to its second active position, to lock the first and second clamping members 212, 214 in their closed position. This arrangement facilitates continued depression of only the second pivotal lever 320 while still maintaining the grabbing device in a position which facilitates locking and unlocking of the hook 3 from a desired object. In all other respects, the third embodiment of the invention is similar to the first embodiment of the invention.

Since certain changes may be made in the above described, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is being claimed:

1. A hook grabbing device for grabbing a hook and opening and closing a latch member of the hook to facilitate hooking and unhooking of the hook from a desired object, said hook grabbing device comprising:
   an elongate shaft having opposed first and second ends;
   a first portion of a lever mechanism being supported adjacent a first end of said elongate shaft;
   first and second clamp members being supported adjacent a second opposed end of said elongate shaft;
   a second portion of said lever mechanism being coupled to at least one of said first and second clamp members for facilitating operation of said first and second clamp members, and said lever mechanism further controlling operation of a push arm being supported by said first clamp member and being located to interact with the latch member of the hook to open the latch member of the hook and facilitate hooking and unhooking of the hook from a desired object.

2. The hook grabbing device according to claim 1, wherein said first and second clamp members are biased into a first position by a spring and said lever mechanism biases said first and second clamp members into a second position.

3. The hook grabbing device according to claim 2, wherein a slidable member is supported by said first clamp member and said lever mechanism operates said slidable member only after said first and second clamp members are sufficiently moved toward the second position.

4. The hook grabbing device according to claim 3, wherein said lever mechanism is coupled to said second clamp member and operation of said lever mechanism causes said second clamp member to move toward said first clamp member to accommodate a desired hook therebetween.

5. The hook grabbing device according to claim 3, wherein said lever mechanism includes a push rod extending from a location adjacent the first portion of said lever mechanism to a location adjacent said first clamp member and said push rod operates said slidable member which supports an activation arm for facilitating opening and closing of the latch member of the hook.

6. The hook grabbing device according to claim 5, wherein said elongate shaft is a hollow shaft and a cable and said push rod extend within said hollow shaft to facilitate operation of said first and second clamp members.

7. The hook grabbing device according to claim 6, wherein an insert member is located within said hollow shaft and said insert member supports a first pulley for guiding movement of said cable within said hollow shaft and said insert member includes a bore for accommodating a first end of said push rod.

8. The hook grabbing device according to claim 7, wherein said second end of said hollow shaft accommodates a plug member which has a first bore for accommodating said cable and a second bore for accommodating said second end of said push rod.

9. The hook grabbing device according to claim 5, wherein said slidable member is biased by a spring into a retracted position away from the latch member and operation of said lever mechanism moves said slidable member into engagement with the latch member of the hook.

10. The hook grabbing device according to claim 5, wherein said lever mechanism has first, second and third arms, said second arm is coupled to said second clamp member via a cable to facilitate operation thereof, said third arm extends through an opening formed in said hollow shaft for engaging with a first end of said push rod, and said first arm is operated by a user to actuate said lever mechanism.

11. The hook grabbing device according to claim 5, wherein said lever mechanism comprises first and second pivotable levers, said first pivotable lever is coupled to said second clamp member by an arm to facilitate operation thereof and said second pivotable lever is coupled to said slidable member to facilitate operation thereof.

12. The hook grabbing device according to claim 11, wherein said first and second clamp members are biased into a closed position by a spring and said first pivotable lever biases said first and second clamp members into an open position.

13. The hook grabbing device according to claim 5, wherein said lever mechanism comprises a first pivotable lever, and said first pivotable lever is coupled to said second clamp member by a rod to facilitate operation thereof.

14. The hook grabbing device according to claim 13, wherein said first and second clamp members are biased into an open position by a spring and said first pivotable lever biases said first and second clamp members into a closed position.

15. The hook grabbing device according to claim 1, wherein said first and second clamp members each have a mating removed recessed area which defines a cavity for receiving a portion of a desired hook therein.

\* \* \* \* \*